US012801191B2

(12) United States Patent
Chen et al.

(10) Patent No.: US 12,801,191 B2
(45) Date of Patent: Nov. 17, 2026

(54) ASSEMBLED COMPUTER CASE

(71) Applicant: TELON TECHNOLOGY CO., LTD., Taipei (TW)

(72) Inventors: En-You Chen, Taipei City (TW); Hsi-Jung Huang, Taipei City (TW)

(73) Assignee: TELON TECHNOLOGY CO., LTD., Taipei City (TW)

( * ) Notice: Subject to any disclaimer, the term of this patent is extended or adjusted under 35 U.S.C. 154(b) by 54 days.

(21) Appl. No.: 19/004,778

(22) Filed: Dec. 30, 2024

(65) Prior Publication Data

US 2026/0147387 A1 May 28, 2026

(30) Foreign Application Priority Data

Nov. 25, 2024 (TW) ................................ 113212866

(51) Int. Cl.
*G06F 1/18* (2026.01)

(52) U.S. Cl.
CPC .................................... *G06F 1/181* (2013.01)

(58) Field of Classification Search
CPC ......... G06F 1/181; G06F 1/20; H05K 5/0217; H05K 5/0234
See application file for complete search history.

(56) References Cited

U.S. PATENT DOCUMENTS 5,660,297 A * 8/1997 Liu ......................... G06F 1/181 220/4.32
10,645,832 B1 * 5/2020 Degner ..................... G06F 1/20
12,497,982 B2 * 12/2025 Chen ..................... F16B 5/0004
2005/0068723 A1 * 3/2005 Squillante ............... G06F 1/181 361/679.46
2007/0253156 A1 * 11/2007 Cheng ...................... H05K 5/10 174/541
2009/0284109 A1 * 11/2009 Lee ......................... G06F 1/181 312/223.2
2011/0095662 A1 * 4/2011 Wang ...................... G06F 1/181 312/223.1
2012/0099271 A1 * 4/2012 Hsu ......................... G06F 1/181 361/679.58
2015/0035421 A1 * 2/2015 Hsiung ................... G06F 1/181 312/265.5
2016/0192509 A1 * 6/2016 Hacking .................. H05K 5/30 312/263
2018/0299930 A1 * 10/2018 Wu ......................... G06F 1/181
2018/0341296 A1 * 11/2018 Chi ......................... G06F 1/184

FOREIGN PATENT DOCUMENTS

| | | |
|---|---|---|
| CN | 221782631 | 9/2024 |
| TW | M633208 | 10/2022 |

* cited by examiner

*Primary Examiner* — Daniel J Rohrhoff
(74) *Attorney, Agent, or Firm* — MUNCY, GEISSLER, OLDS & LOWE, P.C.

(57) ABSTRACT

An assembled computer case includes at least three support columns, a first base, and a second base. Each of the at least three support columns includes a first assembly structure and a second assembly structure, the first base is mounted to the at least three support columns and connected to first assembly structures of the at least three support columns, the second base is positioned opposite the first base, the second base is mounted to the at least three support columns and connected to second assembly structures of the at least three support columns. The second base, the first base, and the at least three support columns jointly define an inner framework with a quadrilateral shape.

16 Claims, 7 Drawing Sheets

ASSEMBLED COMPUTER CASE

CROSS-REFERENCE TO RELATED APPLICATION

The present application claims priority to Taiwan Patent App. No. 113212866, filed Nov. 25, 2024, the entirety of which are incorporated by reference herein.

FIELD OF THE INVENTION

The invention relates to a computer case, in particular to an assembled computer case.

BACKGROUND OF THE INVENTION

An inner framework of currently available computer cases is an integrated fixed structure. While this framework provides sufficient support, it cannot be disassembled.

To address this issue, CN 221782631U and TW M633208 describe solutions for traditional computer cases and transparent computer cases, respectively. Specifically, CN 221782631U discloses a traditional computer case without having columns, but panels in the computer case are fixed in a simple locking manner and jointly define an inner space of the computer case. Although the computer case of CN 221782631U does not have a fixed frame, which can greatly reduce a volume during transportation, a structural strength of the computer case is insufficient, which is prone to denting a top plate.

Take the transparent computer cases disclosed in TW M633208 as an example. This type of computer case adopts a double-sided glass design, providing users with varying visual effects based on lighting changes of inner components, such as models of CX700 RGB and C8 White sold by Antec, as well as models of O11 Dynamic EVO, O11 Vision Compact sold by Lian Li. In TW M633208, the computer case is designed to prevent columns from obstructing a view an interior space of the computer case. Therefore, after installation of the computer case is completed, the columns between the double-sided glass could be removed. However, once the columns are removed, it is also easy to cause instability in the structural strength of the computer case. Additionally, in practical use, users can view the interior of transparent computer cases, and as such, these transparent computer cases are typically placed on desktops. However, current computer cases are generally made of metal, resulting in the transparent computer cases being quite heavy, which is not ideal for placement

SUMMARY OF THE INVENTION

A main object of the invention is to improve the problem that conventional computer cases provide sufficient structural stability but have non-detachable frames.

Another object of the present invention is to address the issue where conventional computer cases are detachable but tend to have insufficient structural strength.

In order to achieve the above object, the invention provides an assembled computer case including at least three support columns, a first base, and a second base. Each of the at least three support columns includes a first assembly structure and a second assembly structure. The first base is mounted to the at least three support columns and is connected to first assembly structures of the at least three support columns. The second base is positioned opposite the first base, and is mounted to the at least three support columns, connected to second assembly structures of the at least three support columns. The second base, the first base, and the at least three support columns jointly define an inner framework of the computer case with a quadrilateral shape.

In one embodiment, the first base includes a plurality of notches connected to the at least three support columns.

In one embodiment, each of the first assembly structures is at least one clamping block disposed in one of the plurality of notches.

In one embodiment, each of the at least three support columns comprises at least one auxiliary connection fin connected to the first base.

In one embodiment, each of the second assembly structures is at least one mounting block.

In one embodiment, a number of the at least three support columns is four.

In one embodiment, the assembled computer case includes a plurality of side panels respectively connected to the first base and the second base.

In one embodiment, the assembled computer case includes at least one reinforcing bracket provided in the inner framework.

In one embodiment, at least one of the plurality of side panels is a see-through panel.

In one embodiment, a number of the at least three support columns is three, the assembled computer case includes two corner connectors at a corner where the at least three support columns are not located, and two corner connectors are respectively connected to the first base and the second base.

In one embodiment, hypothetical extension lines of the two corner connectors are overlapped.

In one embodiment, the assembled computer case includes a plurality of side panels respectively connected to the first base and the second base.

In one embodiment, the plurality of side panels positioned on both sides of the two corner connectors are see-through panels.

In one embodiment, the see-through panels include a bend, the see-through panels are divided into two flat areas and one curved area based on the bend, and the curved area is located between the two flat areas, and a center of the bend is located on a side of the see-through panels facing the inner framework.

In one embodiment, the assembled computer case includes at least one reinforcing bracket provided in the inner framework and connected to the two corner connectors.

In one embodiment, the assembled computer case comprises a plurality of foot pads, and the plurality of foot pads are connected to the at least three support columns, and the plurality of foot pads are close to either the first base and the second base selectively.

In one embodiment, the assembled computer case comprises two fan frames respectively positioned oppositely on the first base and the second base.

In one embodiment, the assembled computer case comprises a filter element connected to one of the two fan frames.

Through the aforementioned embodiments, the invention provides the following advantages compared to conventional technologies:

The invention provides users to assemble the first base and the second base with the at least three support columns, allowing the at least three support columns, the first base, and the second base jointly define the inner framework of the assembled computer case. Compared with conventional ones, the inner framework of the invention is detachable, but provides sufficient structural stability of the assemble computer case as well.

DETAILED DESCRIPTION OF THE PREFERRED EMBODIMENTS

Figure 1:
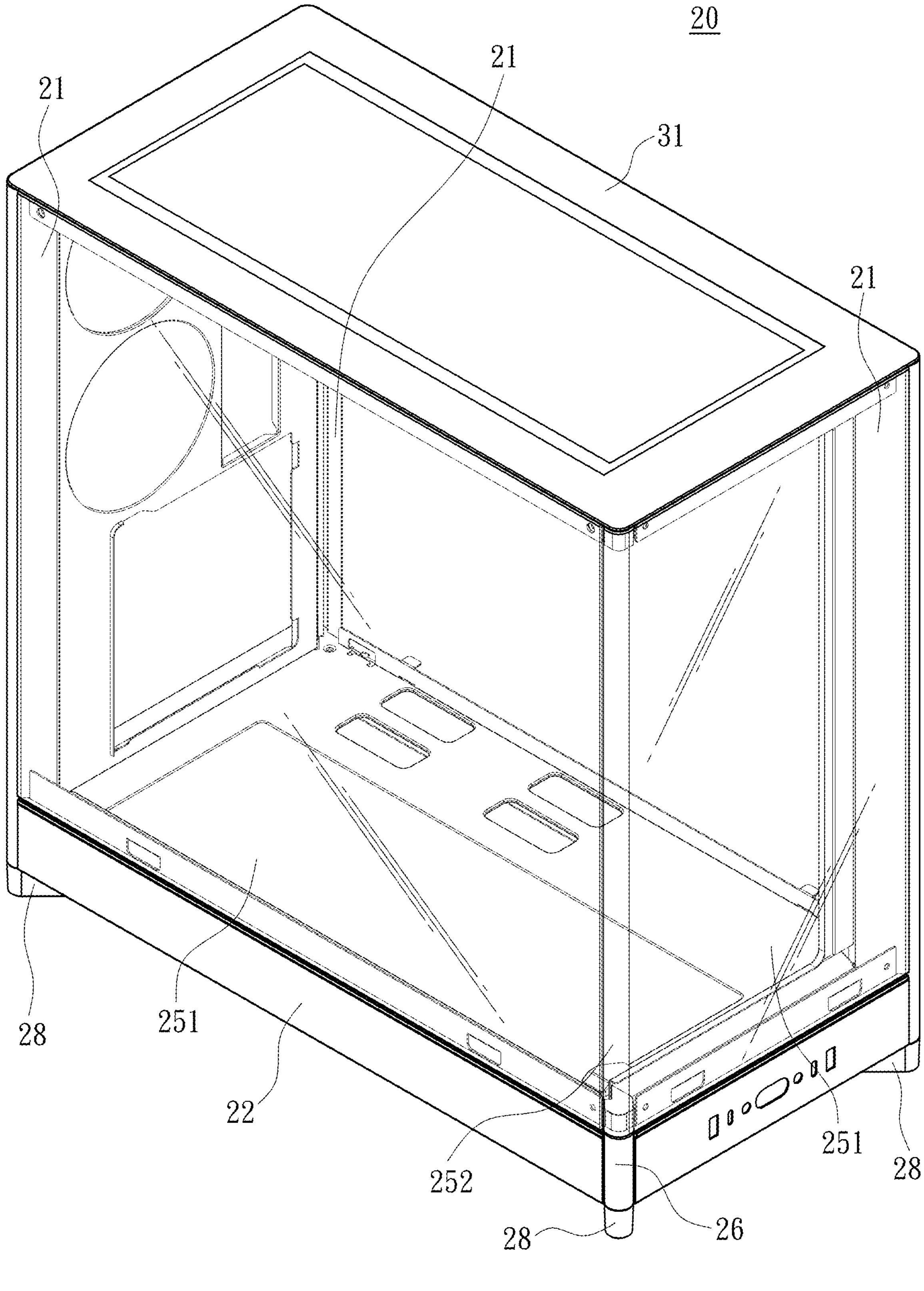
FIG. 1 is a perspective schematic diagram of an embodiment of the invention.

The detailed description and technical content of the invention are as follows, with reference to the accompanying figures:

Please refer to FIG. 1, FIG. 2, FIG. 3, and FIG. 4. The invention provides an assembled computer case 20, including at least three support columns 21, a first base 22, and a second base 23. Each of the at least three support columns 21 includes a first assembly structure 211 and a second assembly structure 212. The first base 22 is mounted to the at least three support columns 21 and is connected to first assembly structures 211 of the at least three support columns 21, such that the at least three support columns 21 are respectively arranged upright at any three corners of the first base 22. The second base 23 is positioned opposite to the first base 22. The second base 23 is mounted on the at least three support columns 21 and is connected to second assembly structures 212 of the at least three support columns 21, such that the at least three support columns 21 are respectively arranged upright at any three corners of the second base 23. It should be noted that the first assembly structures 211 and the second assembly structures 212 are not limited in structure and form, but are designed to ensure that the at least three support columns 21 can be stably assembled with the first base 22 and the second base 23 as required. After assembly, the at least three support columns 21, the first base 22, and the second base 23 jointly define an inner framework 24 with a quadrilateral shape.

As can be seen from the above, the invention allows users to assemble the first base 22 and the second base 23 with the at least three support columns 21, such that the at least three support columns 21, the first base 22, and the second base 23 together form the inner framework 24 of the assembled computer case 20. The assembled computer case 20 of the invention addresses the shortcomings of conventional computer cases with fixed-frames that cannot be disassembled, and when implemented with the at least three support columns 21, the assembled computer case 20 can be constructed into the widely known 'transparent' computer case. The invention retains a feature of providing an unobstructed view of an interior space of the computer case, commonly found in transparent computer cases, and solves structural instability in conventional detachable computer cases such as transparent computer cases. Furthermore, part of the structure of the assembled computer case 20 can be made from lighter materials, such as rigid plastic, which reduces the heavy weight commonly associated with conventional computer cases and is not conducive to display and viewing.

Figure 4:
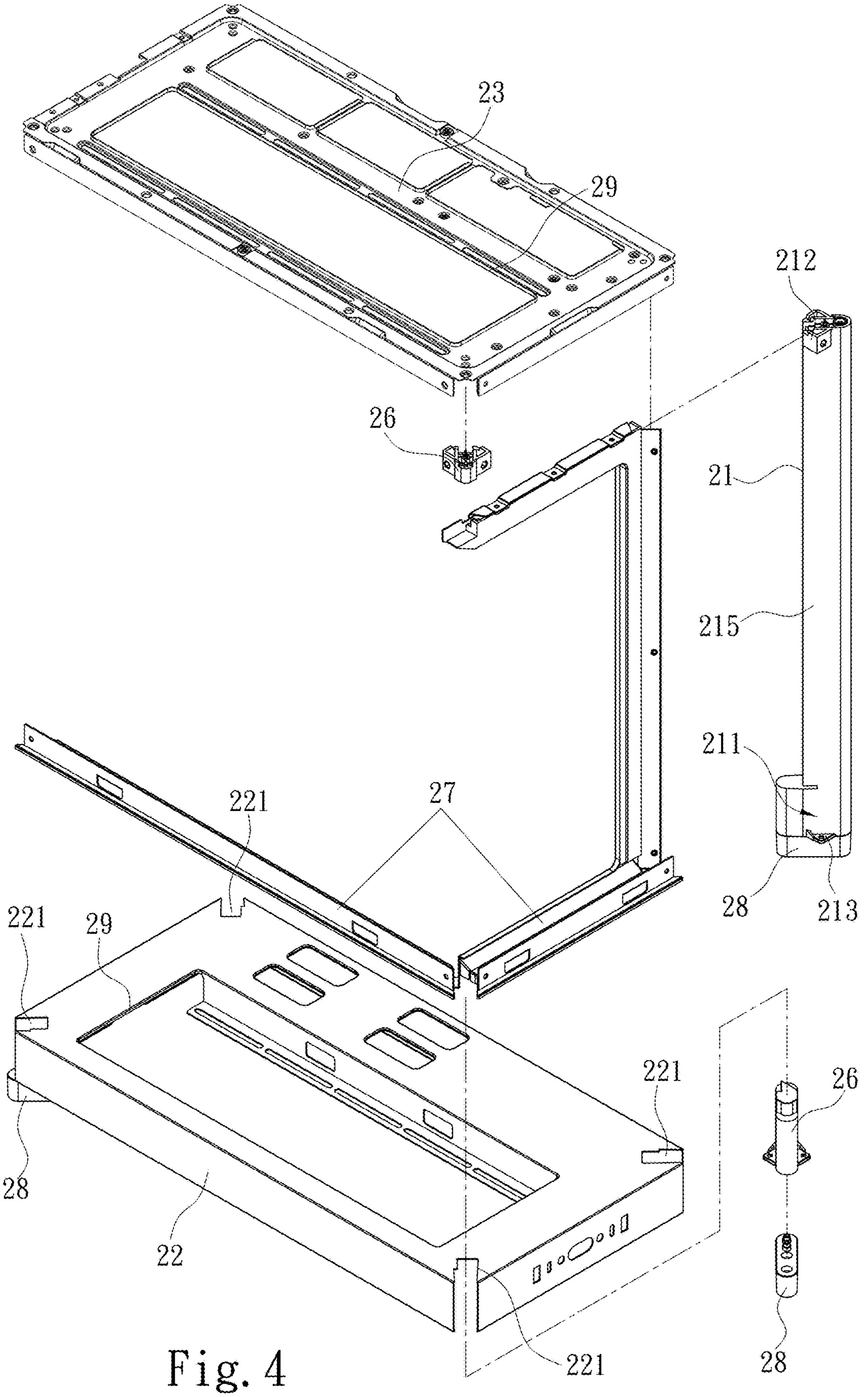
FIG. 4 is a schematic diagram showing a partial disassembly of components of an embodiment of the invention.

Please refer to FIG. 4. In one embodiment, the first base 22 is provided with a plurality of notches 221 connected to the at least three support columns 21, thereby forming an assembly relationship between the first base 22 and the at least three support columns 21. Furthermore, each of the first assembly structures 211 is at least one clamping block disposed in one of the plurality of notches 221. In addition, to assist in connection between the at least three support columns 21 and the first base 22, in one embodiment, each of the at least three support columns 21 includes at least one auxiliary connection fin 213 connected to the first base 22. Each of the second assembly structures 212 is at least one mounting block, protruding from each of the at least three support columns 21, and is connected to one side of the second base 23. In one example, one of the at least three support columns 21 comprises an expansion card positioning structure 214 provided for securing at lease one expansion card (not shown in the drawings). The expansion card positioning structure 214 may be a continuous groove structure with alternating protrusions and indentations, or a plurality of grooves arranged at intervals.

Figure 3:
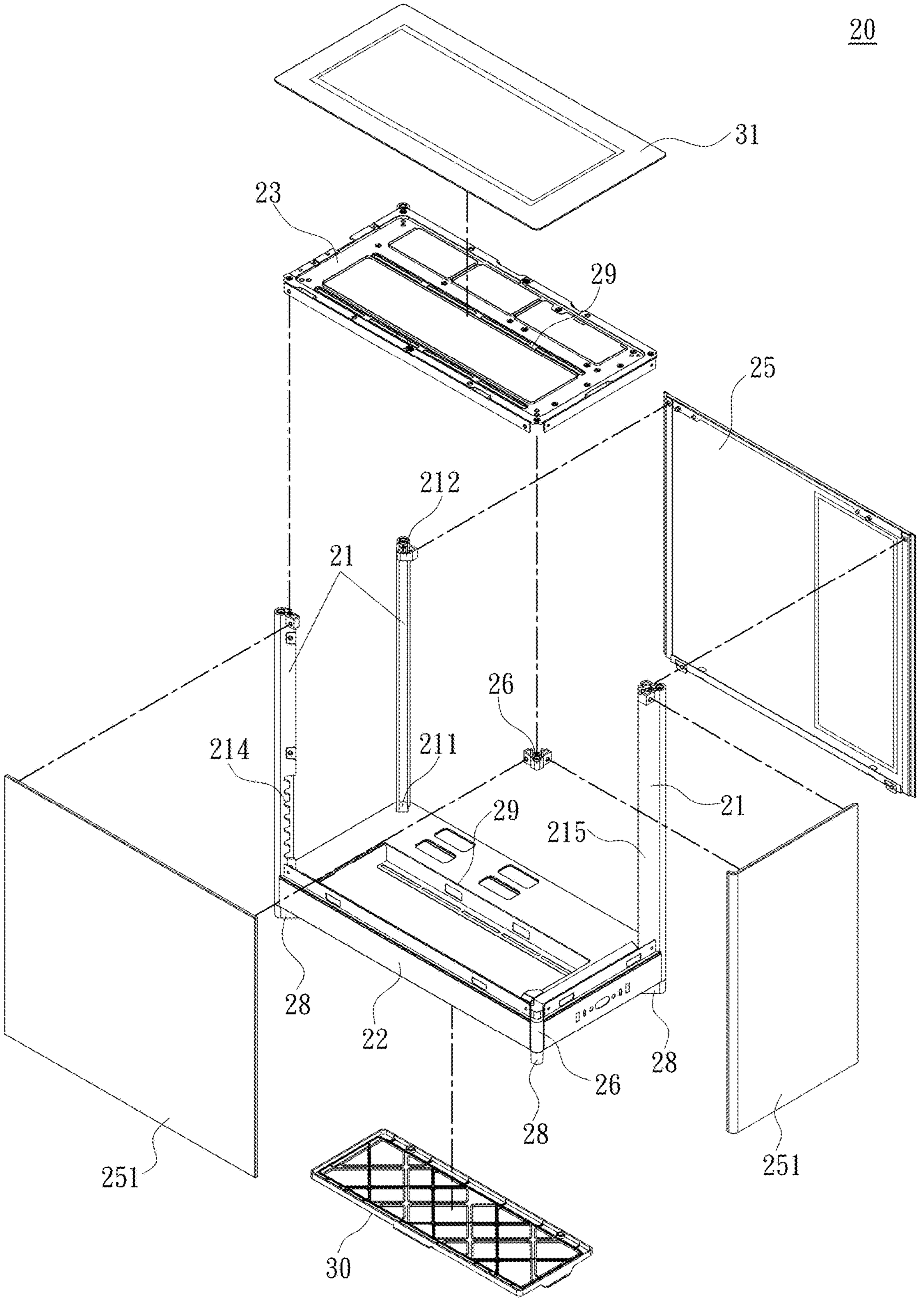
FIG. 3 is an exploded schematic diagram of an embodiment of the invention.
Figure 5:
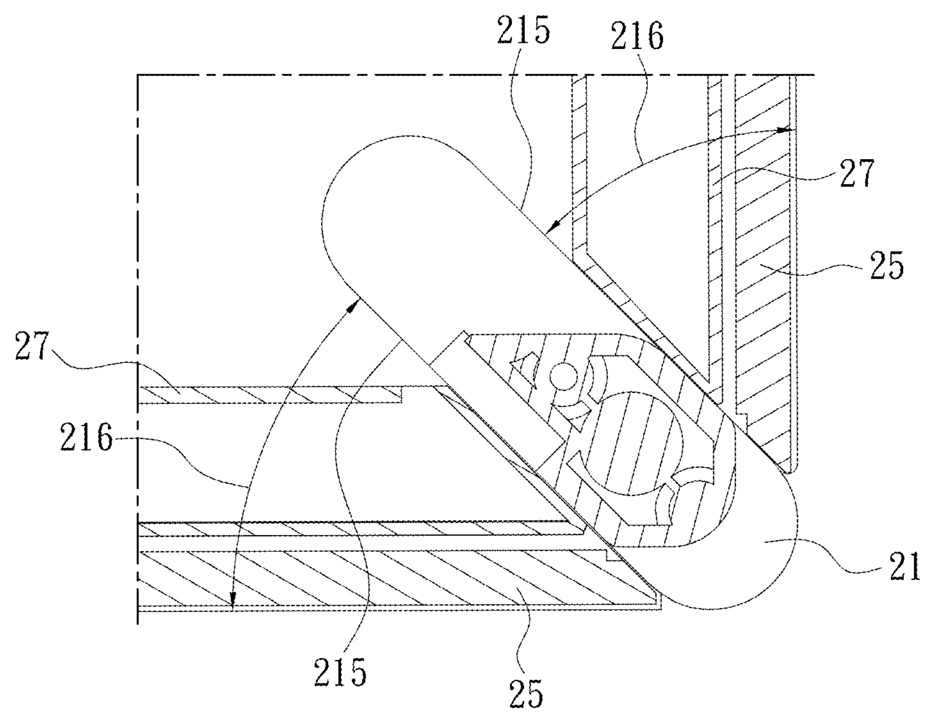
FIG. 5 is a cross-sectional schematic diagram of an embodiment of the invention.
Figure 6:
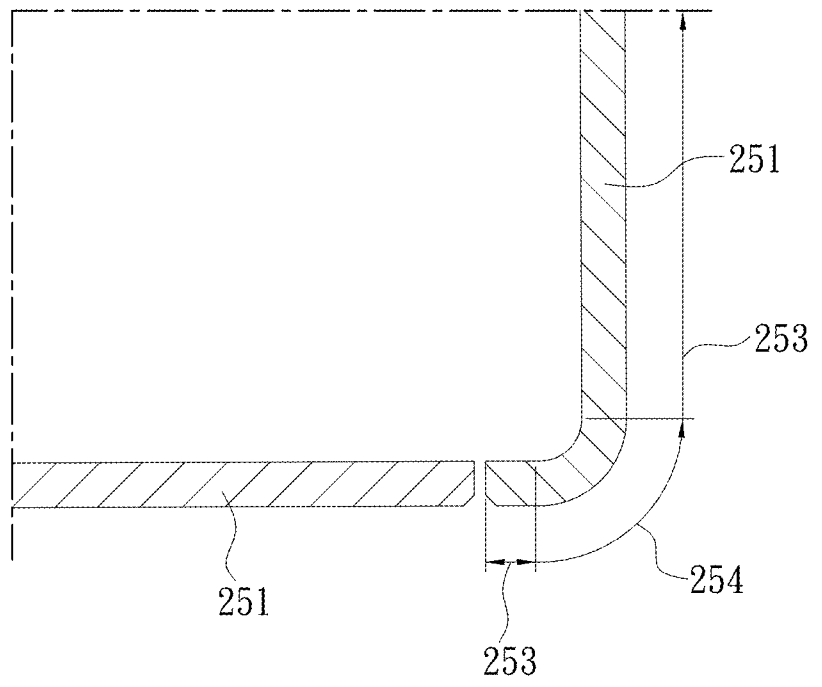
FIG. 6 is a schematic diagram of the transparent panel of an embodiment of the invention.

Please refer to FIG. 3 and FIG. 5. The assembled computer case 20 includes a plurality of side panels 25 connected to the first base 22 and the second base 23. In one embodiment, each of the at least three support columns 21 includes two contact surfaces 215 respectively contacts one of the plurality of side panels 25. The two contact surfaces 215 are located on opposite sides of each of the at least three support columns 21, and each of the two contact surfaces 215 forms an angle 216 of less than 90 degrees with one of the plurality of side panels 25. Specifically, two angles 216 of the two contact surfaces 215 are equal. In order to improve the viewing function, in one embodiment, at least one of the plurality of side panels 25 is a see-through panel 251. For example, the see-through panel 251 may be a transparent acrylic panel, or a transparent glass.

Additionally, a number of support columns 21 in this invention may be three or four. In the case where the assembled computer case 20 is provided with four support columns 21, the assembled computer case 20 includes a quadrilateral shape with four corners, with the four support columns 21 positioned at each of the four corners. In contrast, in the case where the assembled computer case 20 is provided with three support columns 21, the three support columns 21 are positioned at three of the four corners. In this embodiment, the assembled computer case 20 is provided with two corner connectors 26 at a corner where the at least three support columns 21 are not located. The two corner connectors 26 are respectively connected to the first base 22 and the second base 23. It is important to note that the two corner connectors 26 are not connected to each other. When observing the assembled computer case 20 from outside, the two corner connectors 26 are arranged in a broken column form on the assembled computer case 20. The two corner connectors 26 do not connect the first base 22 and the second base 23 in a continuous structure like the at least three support columns 21. Furthermore, hypothetical extension lines of the two corner connectors 26 are overlapped, as shown by reference number 261. Although the two corner connectors 26 are implemented in a broken column form, they provide support for specific corners of the first base 22 and the second base 23, solving the problem of the lack of columns at specific corners in conventional transparent computer cases.

The plurality of side panels 25 positioned on both sides of the two corner connectors 26 may be see-through panels 251 and forming a transparent computer case. When the users view an interior of the assembled computer case 20 through the see-through panels 251, the two corner connectors 26 do not obstruct the users'view. Additionally, one of the aforementioned see-through panels 251 includes a bend 252, with a center of bend 252 located on a side of the see-through panels 251 facing the inner framework 24. More specifically, one of the see-through panels 251 is divided into two flat areas 253 and one curved area 254 based on the bend 252, and the curved area 254 is located between the two flat areas 253. In this embodiment, the curved area 254 is smaller than a curved range typically found in conventional transparent computer cases, which can greatly reduce a fisheye effect caused by the bend 252, when the users view the interior of the assembled computer case 20 through the see-through panels 251. As a result, when the assembled computer case 20 is provided with a holographic projection structure (not shown in the figure), an image from the holographic projection structure will not be overly distorted by the bend 252 of one of the see-through panels 251, enhancing an overall visual experience.

In order to assist a structural stability of the assembled computer case 20, in one embodiment, the assembled computer case 20 includes at least one reinforcing bracket 27 provided in the inner framework 24. For example, in the case where a number of the support columns 21 is four, the at least one reinforcing bracket 27 may be connected to two of four supporting columns 21 located on the same side panel 25 of the assembled computer case 20. In the case where a number of support columns 21 is three, the at least one reinforcement bracket 27 can be connected to two of three support columns 21 located on the same side panel 25 of the assembled computer case 20, or the at least one reinforcement bracket 27 can be connected to one of three support columns 21 and the two corner connectors 26 on the same side panel 25 of the assembled computer case 20.

Figure 2:
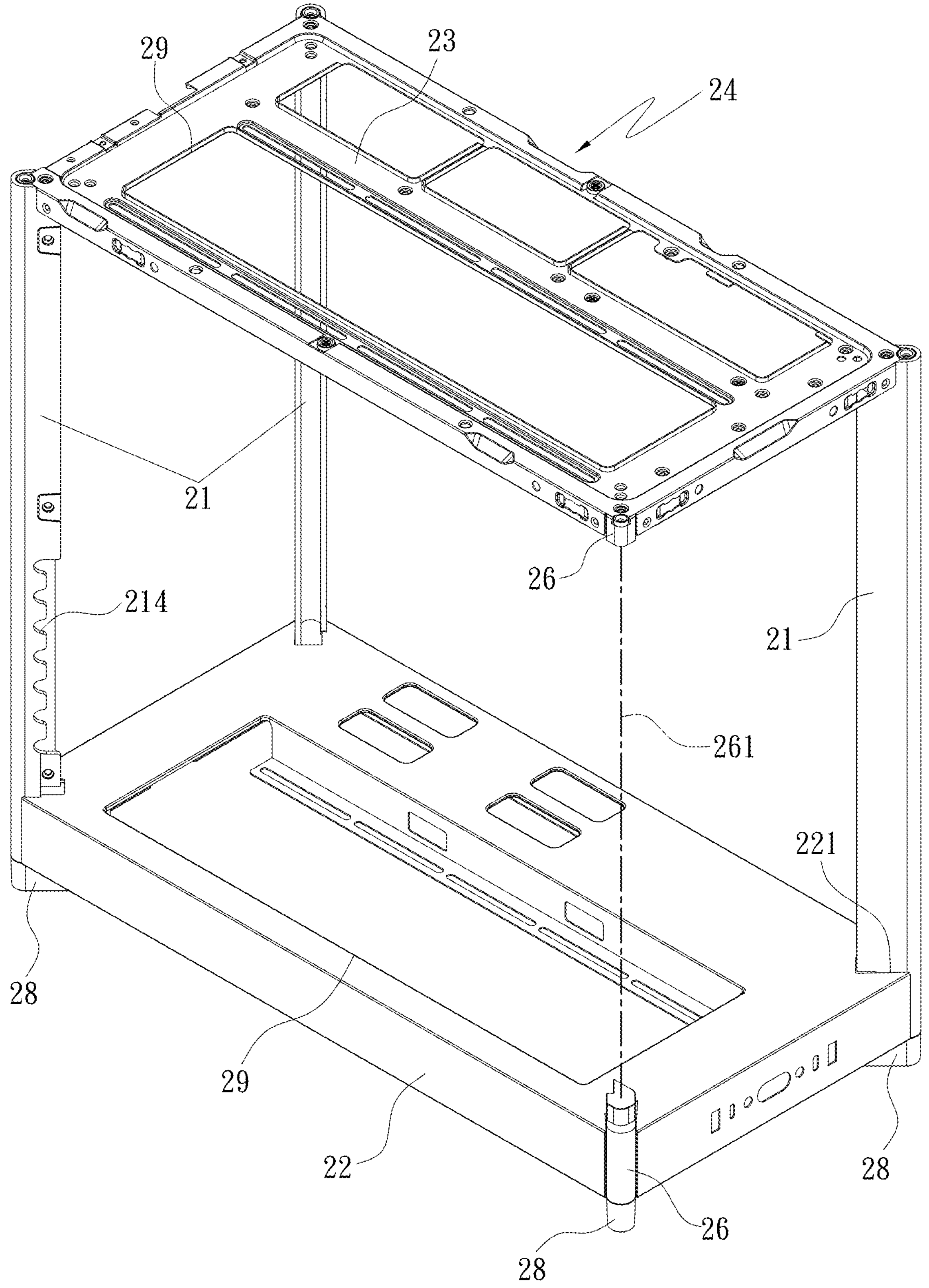
FIG. 2 is schematic diagram of the inner framework of an embodiment of the invention.
Figure 7:
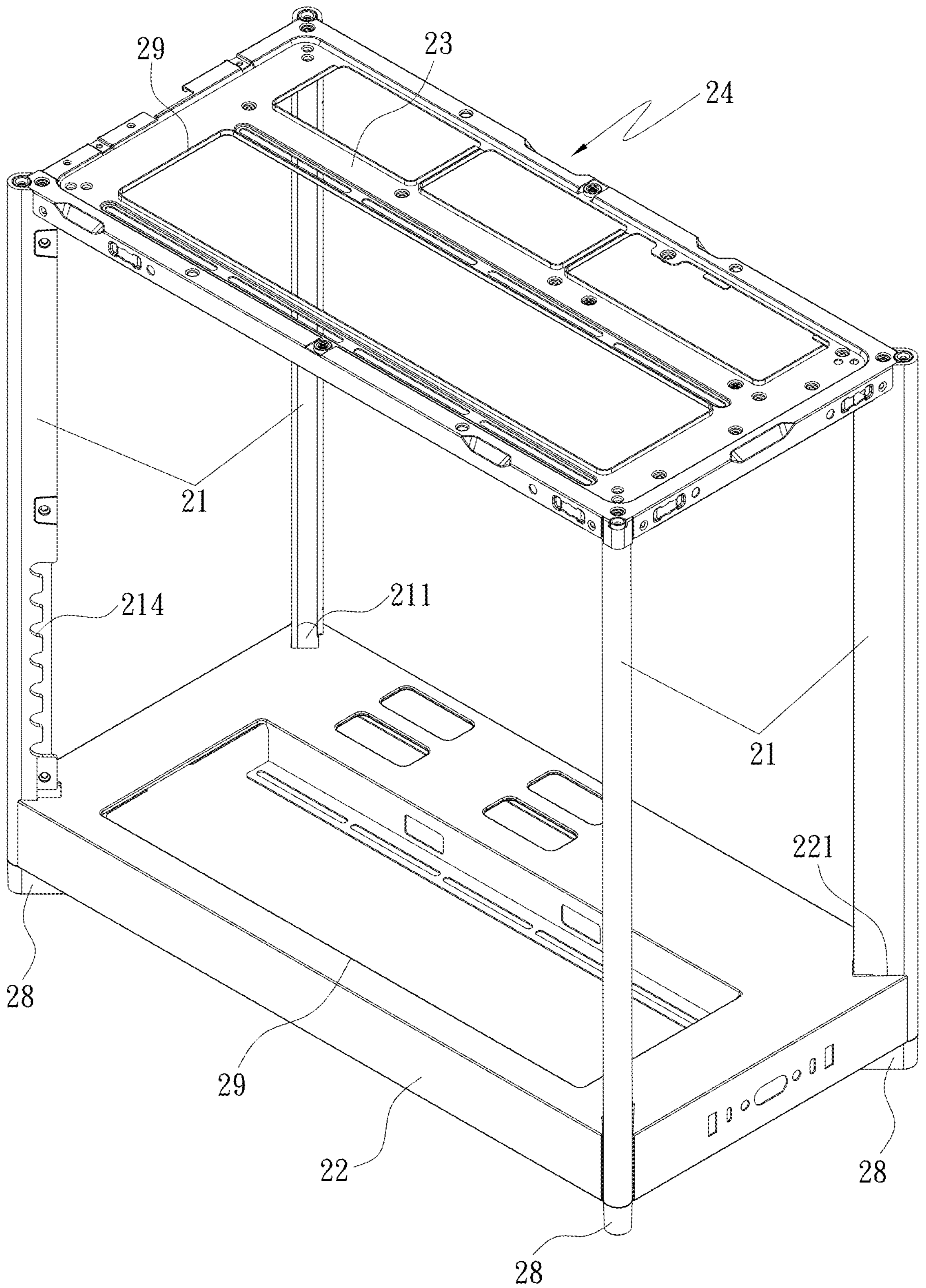
FIG. 7 is a schematic diagram of the inner framework of another embodiment of the invention.

On the other hand, please refer to FIG. 2 and FIG. 7. The assembled computer case 20 includes a plurality of foot pads 28 located at corners thereof. Each of the plurality of foot pads connected to one end of each of the at least three support columns 21 and located at a bottom of the assembled computer case 20. In the case where a number of support columns 21 is four, each of plurality of foot pads 28 is connected to one of the four support columns 21. In the case where a number of support columns 21 is three, one of the plurality of foot pads 28 is connected to one of the two corner connectors 26, and each one of the remaining foot pads 28 is connected to each one of three of the support columns 21.

Figure 8:
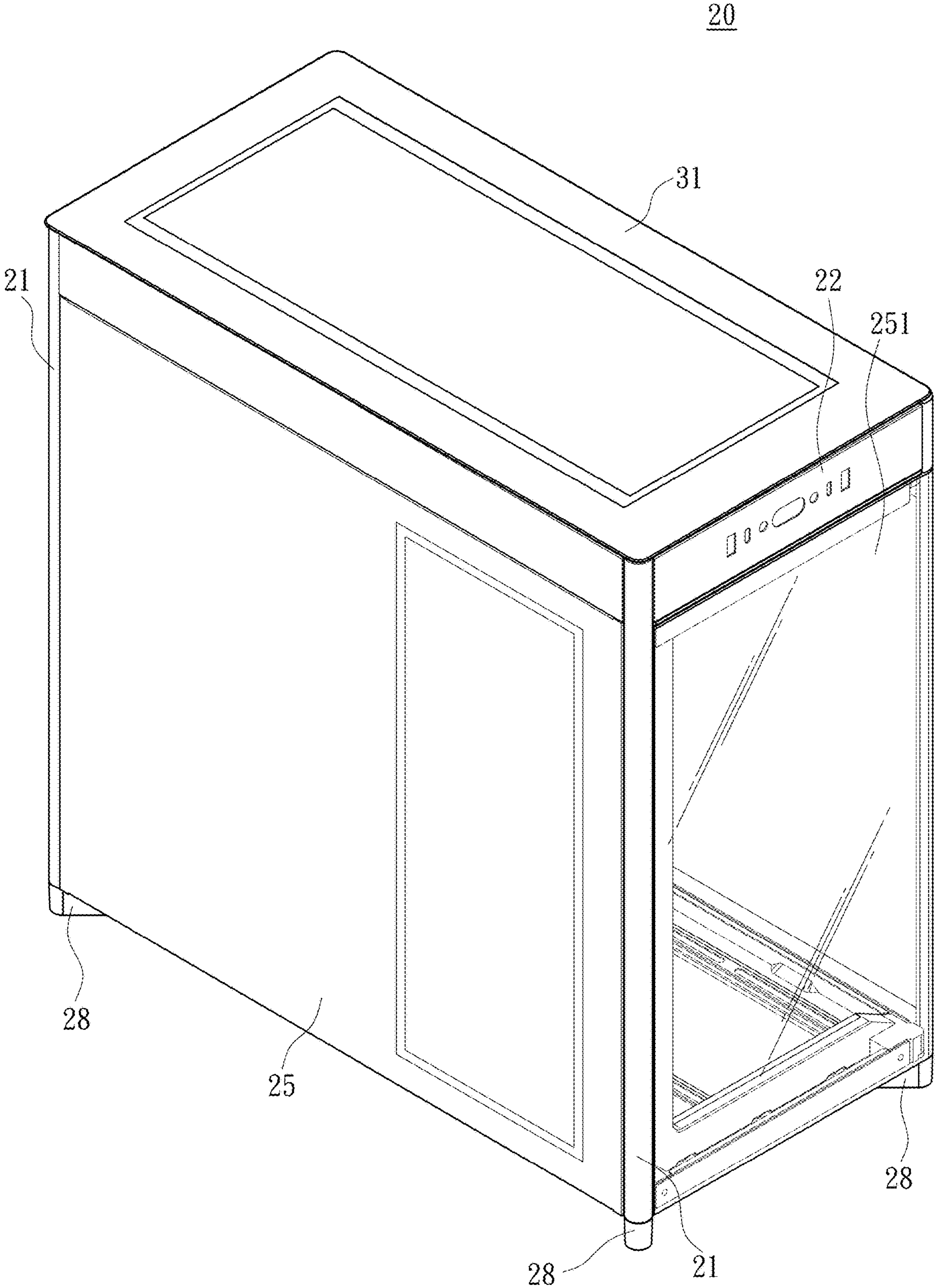
FIG. 8 is a schematic diagram showing the flipped computer case of an embodiment of the invention.

More specifically, the assembled computer case 20 may be further adjusted based on the users'needs, commonly referred to in the industry as a "flip case." Referring to FIG. 1 of the invention, the first base 22 is located at the bottom of the assembled computer case 20, and the second base 23 is located at a top of the assembled computer case 20. The plurality of foot pads 28 are connected to one end of at least three support columns 21 close to the first base 22. This configuration can be called a first form of the assembled computer case 20 when it is not flipped. When the assembled computer case 20 is flipped, positions of the first base 22 and the second base 23 are swapped. The first base 22 is located at the top of the assembled computer case 20, and the second base 23 is positioned at the bottom of the assembled computer case 20, as shown in FIG. 8. At this point, the plurality of foot pads 28 are connected to one end of the at least three support columns 21 close to the second base 23. This configuration can be called a second form of the assembled computer case 20 after flipping. By changing forms of the assembled computer case 20, the users can select configurations of the assembled computer case 20 based on their preferences or placement needs. The invention allows the assembled computer case 20 to provide different visual experiences for the users depending on a selected form.

Please refer to FIG. 2 and FIG. 3. In one embodiment, the assembled computer case 20 includes two fan frames 29, which are positioned oppositely on the first base 22 and the second base 23, respectively. Each of two fan frames 29 provides at least one cooling fan (not shown in the figure) to be arranged therein. The term "oppositely positioned" described herein means that the two fan frames 29 are located vertically opposite to each other in the assembled computer case 20, and the two fan frames 29 are vertically opposite to each other in a projection position. Furthermore, the assembled computer case 20 includes a filter element 30, which is connected to one of the two fan frames 29 and is selectively disposed on either the first base 22 or the second base 23. Specifically, the filter element 30 is selectively assembled to either the first base 22 or the second base 23 based on positions of the first base 22 or the second base 23 on the assembled computer case 20. The filter element 30 serves to filter airflow generated by the at least one cooling fan installed in one of the two fan frames 29.

In one embodiment, the assembled computer case 20 may further include a decorative panel 31 assembled with the first base 22 or the second base 23 based on configurations of the assembled computer case 20. Furthermore, the decorative panel 31 can be a top plate of the assembled computer case 20, that is to say, the decorative panel 31 is assembled with either the first base 22 or the second base 23 located on top of the assembled computer case 20. In addition, the decorative panel 31 may further include a hollow area, and a mesh is provided corresponding to the hollow area.

What is claimed is:

1. An assembled computer case, comprising:
at least three support columns, each of the at least three support columns comprising a first assembly structure and a second assembly structure;
a first base, mounted to the at least three support columns and connected to the first assembly structures of the at least three support columns; and
a second base, positioned opposite the first base, mounted to the at least three support columns, and connected to the second assembly structures of the at least three support columns, wherein the second base, the first base, and the at least three support columns jointly define an inner framework with a quadrilateral shape,
wherein the first base comprises a plurality of notches, and the at least three support columns are inserted into the plurality of notches, respectively, and
wherein each of the first assembly structures is at least one clamping block disposed in one of the plurality of notches.

2. The assembled computer case as claimed in claim 1, wherein each of the at least three support columns comprises at least one auxiliary connection fin connected to the first base.

3. The assembled computer case as claimed in claim 2, wherein each of the second assembly structures is at least one mounting block.

4. The assembled computer case as claimed in claim 1, wherein a number of the at least three support columns is four.

5. The assembled computer case as claimed in claim 4, wherein the assembled computer case comprises a plurality of side panels respectively connected to the first base and the second base.

6. The assembled computer case as claimed in claim 5, wherein the assembled computer case comprises at least one reinforcing bracket provided in the inner framework.

7. The assembled computer case as claimed in claim 5, wherein at least one of the plurality of side panels is a see-through panel.

8. The assembled computer case as claimed in claim 1, wherein a number of the at least three support columns is three, the assembled computer case comprises two corner connectors at a corner where the at least three support columns are not located, and the two corner connectors are connected to the first base and the second base.

9. The assembled computer case as claimed in claim 8, wherein hypothetical extension lines of the two corner connectors are overlapped.

10. The assembled computer case as claimed in claim 8, wherein the assembled computer case comprises a plurality of side panels connected to the first base and the second base.

11. The assembled computer case as claimed in claim 10, wherein the plurality of side panels positioned on both sides of the two corner connectors are see-through panels.

12. The assembled computer case as claimed in claim 11, wherein the see-through panels comprise a bend, the see-through panels are divided into two flat areas and one curved area based on the bend, and the curved area is located between the two flat areas, and a center of the bend is located on a side of the see-through panels facing the inner framework.

13. The assembled computer case as claimed in claim 10, wherein the assembled computer case comprises at least one reinforcing bracket provided in the inner framework and connected to the two corner connectors.

14. The assembled computer case as claimed in claim 1, wherein the assembled computer case comprises a plurality of foot pads, and the plurality of foot pads are connected to the at least three support columns, and the plurality of foot pads are close to either the first base and the second base selectively.

15. The assembled computer case as claimed in claim 14, wherein the assembled computer case comprises two fan frames respectively positioned oppositely on the first base and the second base.

16. The assembled computer case as claimed in claim 15, wherein the assembled computer case comprises a filter element connected to one of the two fan frames.

* * * * *